Patented Aug. 1, 1933

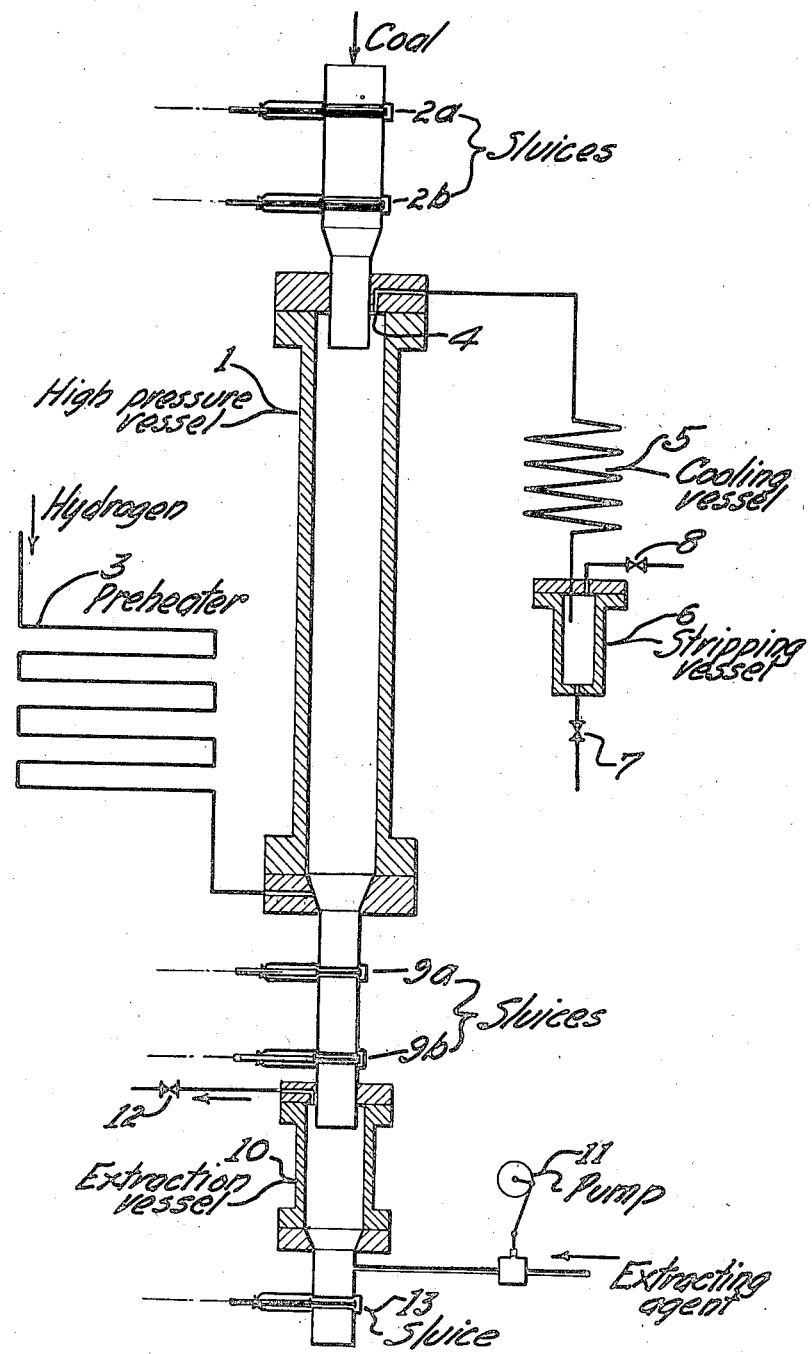

1,920,887

UNITED STATES PATENT OFFICE 1,920,887

PRODUCTION OF VALUABLE LIQUID PRODUCTS FROM SOLID DISTILLABLE CARBONACEOUS MATERIALS BY DESTRUCTIVE HYDROGENATION

Mathias Pier, Heidelberg, Germany, assignor, by mesne assignments, to Standard-I. G. Company, Linden, N. J., a Corporation of Delaware Application July 11, 1929, Serial No. 377,622, and in Germany July 17, 1928

6 Claims. (Cl. 196—53)

This invention relates to improvements in the manufacture and production of valuable liquid products from solid distillable carbonaceous materials, such as various kinds of coals, oil shales or other bituminous substances.

The constituents or conversion products of solid distillable carbonaceous materials, such as various kinds of coals, oil shales or other bituminous substances, which are liquid or which liquefy when heated are frequently retained very tenaciously in the pores of the solid constituents, and a thorough extraction with solvents is therefore only possible with difficulty because the solvents cannot penetrate into the fine canals and pores.

I have now found that a far reaching separation of constituents or conversion products, which are liquid or which liquefy when heated, from the aforesaid solid constituents, is possible when the said intial materials are first subjected to a destructive hydrogenation, under mild conditions, so that the formation of benzines is substantially avoided and then subjected to a treatment by extraction with solvents. By destructive hydrogenation is meant a monomolecular decomposition, in the presence of an excess of hydrogen, in which no polymerization takes place. Polymerization is prevented by the hydrogen employed, the effect of which is to saturate, or at least partially saturate, the highly unsaturated products produced by the decomposion and thus prevent their combination with each other. The products obtained which are liquid or which become liquid when heated are all hereinafter understood to be comprised by the term "liquid products."

The destructive hydrogenation may be carried out with or without the employment of catalysts, and in particular of the known catalysts immune from poisoning by sulphur.

The desirability of carrying out the destructive hydrogenation under such conditions that practically no paraffinic benzines are formed, is prompted by the fact that when working in this manner no separation of the asphaltic compounds in flocks takes place and that the further treatment by extraction of the substances obtained by the destructive hydrogenation is very difficult, when once such a precipitation has occurred. In order to avoid this precipitation in all cases, care should be taken that the heavy oils which effect the emulsification of the asphaltic substances are not destroyed by the destructive hydrogenation. This is effected by selecting temperatures which are not too high or by suitably regulating the duration of the reaction so that it is shorter than the period required for the conversion of the heavy oils, as for example by operating with a counter-current of the hydrogenating gas, the heavy oils being thus removed from the reaction space and a further conversion of the said oils avoided.

The mild conditions of working employed will depend on the nature of the initial materials treated, the pressure, the temperature, the duration of the treatment, the partial pressure of the reagents and the activity of the catalyst, if a catalyst be employed. Thus, for example, if no catalyst at all be employed more vigorous conditions may be employed than if this is not the case. If on the other hand a very active catalyst is employed the other conditions must be correspondingly milder. The higher the temperature, the higher will be the pressure employed and the more vigorous the reaction, the temperature must, however, not be chosen so high that any substantial conversion to benzine takes place. Again the longer duration of the treatment the greater will be the tendency towards the formation of the benzines. Thus, for example, if a rather long treatment is desirable, the temperature and pressure must be correspondingly low and the catalyst, if such be employed, must be of low activity. Further, in case an initial material be employed, which is not very sensitive to destructive hydrogenation the conditions of working may be rendered more strenuous.

For example, temperatures of up to about 600° C. and preferably up to about 480° C. may be employed, and as a rule about 300° C. will be the lower limit of temperature employed. The pressures employed may vary within wide limits. Thus, for example, pressures of 20, 50, 100, 200, 300 atmospheres or more may be employed.

The constituents of high boiling point, which are obtained by the treatment with hydrogen, under mild conditions with the avoidance of the flocculation of the asphaltic substances are an excellent initial material for the production of lubricating oil. The fraction which is suitable for lubricating oils may be separated before or/and after the extraction, for example by distillation, as may likewise any paraffins which may be recovered before and/or after the reaction. If desired the fraction, which is to be used for working up into lubricating oil may be treated by destructive hydrogenation under pressure for the purpose of further improvement.

A great variety of solvents may be employed for the extraction, which is preferably carried out under pressure, for example hydrocarbons, in particular those with a high content of aromatic hydrocarbons, hydrocarbon derivatives, liquid sulphur dioxide and the like or mixtures of these substances. Generally speaking the solvents of high molecular weight have a greater solvent power than those of low molecular weight. The extraction is more complete the greater the amount of cyclic compounds the solvent contains. The solvent for the extraction may also be prepared in the first stage of the process itself. In order that the solvent may penetrate into the pores of the solid materials during the extraction a certain minimum pressure is preferable, the value of which depends on the nature of the materials to be treated. The higher the temperatures at which the operation is carried out the higher are the pressures which must be employed, especially when employing solvents of low boiling point, in order that they shall remain liquid. Care should be taken that no solvent is employed which would promote a flocculation of the asphaltic substances. If pressures be employed for the extraction treatment these may be varied within wide limits, such of 5, 10, 20, 50, 100, 200, 300, 500, 1000 atmospheres or even more being very suitable.

The present invention will be further explained with reference to the accompanying drawing showing in a somewhat diagrammatic fashion a sectional elevation of a plant in which the process according to this invention may be advantageously carried out. It is, however, to be understood that the invention is not restricted to the particular arrangement shown.

Referring to the drawing in detail numeral 1 denotes a hydrogenating vessel capable of withstanding a high pressure into which fresh solid carbonaceous materials are introduced by way of sluices 2ª and 2ᵇ. Hydrogen is preheated in preheater 3 and then passed into vessel 1, which may be maintained at a temperature of about 450° C. and under a pressure of about 200 atmospheres. The vapours of hydrocarbons evolved during the hydrogenation leave vessel 1 together with the waste hydrogenating gas at 4, are condensed in cooling vessel 5 and separated from the uncondensed hydrogen in stripping vessel 6. From this stripping vessel the condensed liquid hydrocarbons may be removed by valve 7 while the hydrogen leaves by way of valve 8. The bulk of mildly hydrogenated carbonaceous materials collects at the bottom of vessel 1 and is passed by means of sluices 9ª and 9ᵇ into the extraction vessel 10 in which it is treated, preferably under pressure, for example of 75 atmospheres, with a suitable extracting agent, such as benzene, introduced by means of pump 11. The extract leaves vessel 10 by way of valve 12 while the solid residue is removed through sluice 13.

The following example will further illustrate how this invention may be carried out in practice, but the invention is not restricted thereto.

*Example*

Brown coal containing about 11 per cent of ashes is passed at about 450° C. and under a pressure of about 200 atmospheres through a high pressure reaction vessel through which hydrogen is led in counter-current. About 40 per cent of the dry coal introduced is converted into liquid products, which are carried along in the form of vapor in the stream of hydrogen, and in a condenser behind the reaction vessel a mobile oil is obtained which may be completely converted into benzine by further treatment. The solid or pasty carbonaceous residue is removed from the reaction vessel and by treatment with benzene yields, besides an extraction residue very rich in ashes, 45 per cent of extract which consists mainly of hydrocarbons and hydrocarbon derivatives of high molecular weight which are suitable for working up into lubricating oil and the like. The said extraction treatment with benzene is advantageously carried out under pressure, say at 75 atmospheres.

What I claim is:

1. Process for obtaining liquids from solid distillable carbonaceous materials which comprises subjecting said materials to destructive hydrogenation at a temperature of 300 to 600° C., and a pressure of at least 20 atmospheres in the presence of an excess of hydrogen, the temperature, pressure, hydrogen pressure and duration of treatment being so correlated as to effect a substantial conversion of said carbonaceous materials into high boiling oils containing any asphalt present in an emulsified state but with the formation of little benzines, and removing said high boiling oils from the treated solid materials, and then subjecting the residue of the treated solid materials to an extraction with an organic solvent which is not a precipitant for asphalt to dissolve from said residue the organic substances which are liquid and those which liquefy upon heating.

2. A process as defined in claim 1 wherein the hydrogen is passed in a stream counter-current to the solid carbonaceous materials and the high boiling oils removed by the hydrogen stream in the form of a vapor.

3. Process for obtaining liquids from solid distillable carbonaceous materials which comprises subjecting said materials to destructive hydrogenation at a temperature of 300 to 600° C., a pressure of at least 20 atmospheres, with an excess of hydrogen and in the presence of a catalyst immune to sulfur poisoning, the temperature, pressure, hydrogen pressure, duration of treatment and activity of the catalyst being so correlated as to effect a substantial conversion of said carbonaceous materials into high boiling oils containing any asphalt present, in an emulsified state but with the formation of little benzines, the duration of treatment being shorter the higher the temperature and pressure and the greater the activity of the catalyst, and removing said high boiling oils from the treated solid materials, and then subjecting the residue of the treated solid materials to an extraction with an organic solvent which is not a precipitant for asphalt to dissolve from said residue the organic substances which are liquid and those which liquefy upon heating.

4. The process as defined in claim 3 wherein the hydrogen is passed in a stream countercurrent to the solid carbonaceous materials and acts to remove in the form of a vapor the high boiling oils formed in the process.

5. The process as defined in claim 1 wherein a temperature of about 450° C. and a pressure of 200 atmospheres are employed in the destructive hydrogenation.

6. The process as defined in claim 3 wherein the hydrogen is passed in a stream countercurrent to the carbonaceous materials and acts to remove in the form of a vapor the high boiling oils formed in the process, a temperature of 450° C. and a pressure of 200 atmospheres is used in the destructive hydrogenation and benzene in the organic solvent used in the extraction.

MATHIAS PIER.